March 31, 1936.　　　　G. B. NEWKIRK　　　　2,035,913
FASTENER
Filed Aug. 10, 1935

INVENTOR
George B. Newkirk
BY James E. Lynch
ATTORNEY

Patented Mar. 31, 1936

2,035,913

UNITED STATES PATENT OFFICE 2,035,913

FASTENER

George B. Newkirk, Queens, N. Y., assignor to Fairchild Sons, Incorporated, a corporation of New York Application August 10, 1935, Serial No. 35,615

1 Claim. (Cl. 292—241)

This invention relates to fasteners, and more particularly to that type of fasteners which are adapted to attach covers or the like to box-like receptacles or casings in clamped relation.

One of the objects of this invention is to provide a fastener for clamping a cover to a casing to hold these elements in secure and positive engagement.

Another object consists in the provision of a simple, rugged, and relatively inexpensive fastener which may be moved to an operated position to perform the clamping operation in an expeditious and effective manner.

These and further objects will be apparent from the following description, when considered in connection with the accompanying drawing, in which one embodiment of the invention is illustrated.

Figure 1:
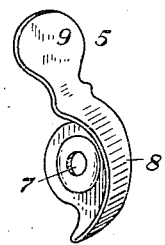
Figure 2:
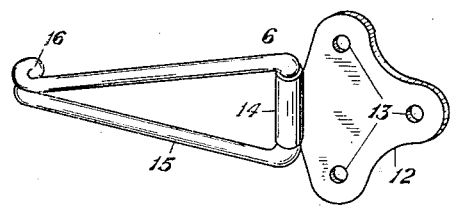
Figure 3:
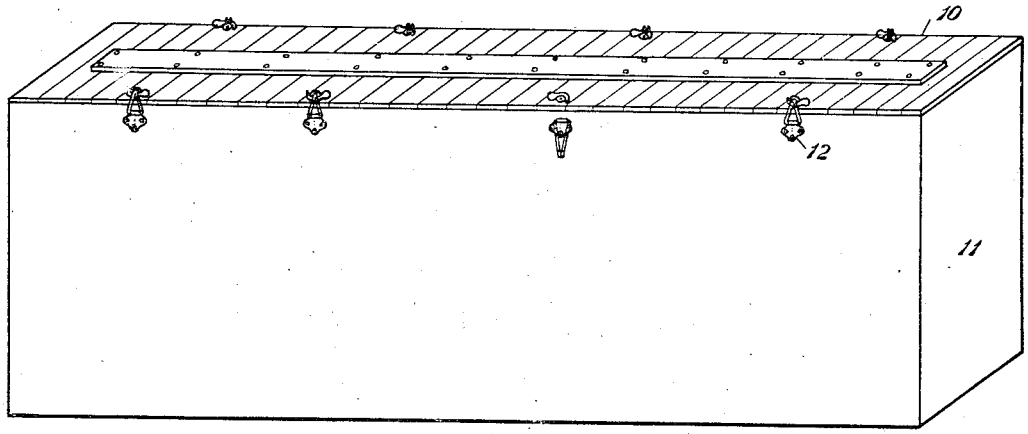
Figure 4:
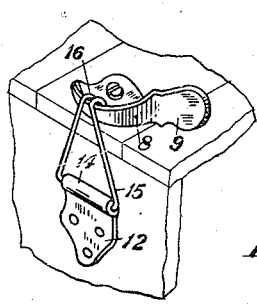

Referring to the drawing, Figure 1 illustrates a perspective view of one of the elements of the fastener; Fig. 2 is an elevational view of the other or coacting element of the fastener; Fig. 3 is a perspective view of the type of casing with which the improved fastener is particularly adapted to be used; and Fig. 4 is an enlarged perspective of the fastener showing its elements in engaged and locked position.

In Figs. 1 and 2 of the drawing there are shown two coacting members, 5 and 6, respectively, which constitute the fastener and this may be made of any suitable metal or other substance. These fasteners are mounted in a series of any desired number at suitable and equally spaced intervals along the parallel, adjacent edges of the cover and casing as is more clearly illustrated in connection with Fig. 3.

Each of the series of elements 5 is provided with an opening 7 through which a screw or axial member may be inserted and rigidly secured to the cover so that the member 5 may be readily rotated thereabout. The member 5 is provided with a vertical cam-shaped flange 8 at one of its edges which terminates in a thumb-piece or a finger-piece 9, such as is found desirable in devices of this invention. The member 9 may be used to impart rotary movement to turn the element 5 about axis 7. The cam-flange 8 is adapted to coact with the pivoted hook or gripping element 6, more clearly illustrated in Fig. 2 and which will be presently described in detail. The element 5, when brought in engagement with the hook 16 of the element 6 and further pressure applied causes the cover 10 to be forced tighter and tighter against the casing 11, as said element 5 is advanced in its rotation, until an effective and tight closure is made between said cover and casing.

The cam-flange 8 comprises a sloped wall, the level of which may rise as it advances toward element 9. The contour of this wall is such that when the tip of flange 8 engages the hook or gripping-element 16 and rotation of the flange in a clockwise direction is effected, more and more pressure will be directly applied to the hook or gripping element 16. Thus, the pressure applied remains under control at all times, and may be changed to any desired value and permanently fixed at that value if so desired. The wall of the cam-flange 8, it will be noted, is semi-circular in shape and its center may coincide with the center of opening 7. It will be understood, of course, that the center of the cam-flange 8 need not be coincident with the opening 7.

Each of the series of members 6 is mounted on the parallel sides of the casing in alinement near the top edge thereof and correspond in number to the coacting cam members 5 which are mounted on adjacent parallel edges of the cover. The members 6 are provided with permanent mounting plates 12 and a suitable number of openings 13 extend therethrough. Screws, rivets or the like may be introduced through these openings and extend into the sides of the casing 11 in such manner as to rigidly secure the mounting plates in position. A tubular portion 14 is formed in the plate 12 and when the plate is in mounted position this portion lies at the top of the plate, as shown in Figs. 3 and 4. The tubular portion serves as a bearing for a triangular frame member 15 and provides a rotatable hinged connection therefor. The frame member is provided with a hook or gripping portion 16 at its free end, to which reference has already been made. When it is desired to clamp the cover 10 to the casing 11 the member 15 is rotated upwardly so that its hook portion 16 may be engaged by the cam-flange 8. The rotation of said cam member when thus engaged imparts increasing pressure to clamp the cover and casing together, as previously outlined. When the cover 10 is not in place the member 15 may be turned down about the tubular portion 14 and folded against the side of the casing.

It will be noted that the cam-shaped elements 5 are so mounted that their axes lie parallel to each other and perpendicular to the cover 10, while the hinged elments 6 are so mounted that their axes lie coincident or aligned with each other and also substantially coincident with the side of the casing 11 and parallel to the cover 10.

The provision of a fastener with coacting members of the character and arrangement above described produces an effective means for clamping the cover and casing in position.

It will be observed that in Fig. 3, the gripping and coacting fastening members 5 and 6 are positioned along two sides of the box-like enclosure. It will be understood, however, that one side of the box-like enclosure may be hinged, and the parallel side may be provided with fastening devices of the type above described.

From the foregoing it is thought that the construction, operation and many advantages of the herein described and delineated invention will be apparent to those skilled in the art, without further description. It will be understood that various changes in the size, shape and proportion and minor details of construction may be resorted to without departing from the spirit or sacrificing any of the advantages of the invention, as defined in the appended claim.

What is claimed is:

A fastener for box-like receptacles having a removable cover co-terminating with a vertical exterior side wall of the receptacle, a fastener arranged along a parallel edge of the cover and along an adjacent edge of the receptacle, said fastener including two co-acting elements, one of said coacting elements being rotatably mounted on the cover and having an axis of rotation perpendicular thereto and parallel to the side of receptacle, said element having a cam-flange, the other of said coacting elements having a base-plate affixed to a side of the receptacle, and a triangular frame member, the base of which is hingedly mounted in the base-plate and having an axis of rotation along one of the sides of the receptacle and parallel to the surface of the cover, the free end of the frame member having a bent-over hook-like terminal engageable with the inner side of said cam-flange of the rotatable member to exert a clamping action on the receptacle and cover to securely fasten them together.

GEORGE B. NEWKIRK.